Patented Nov. 28, 1933

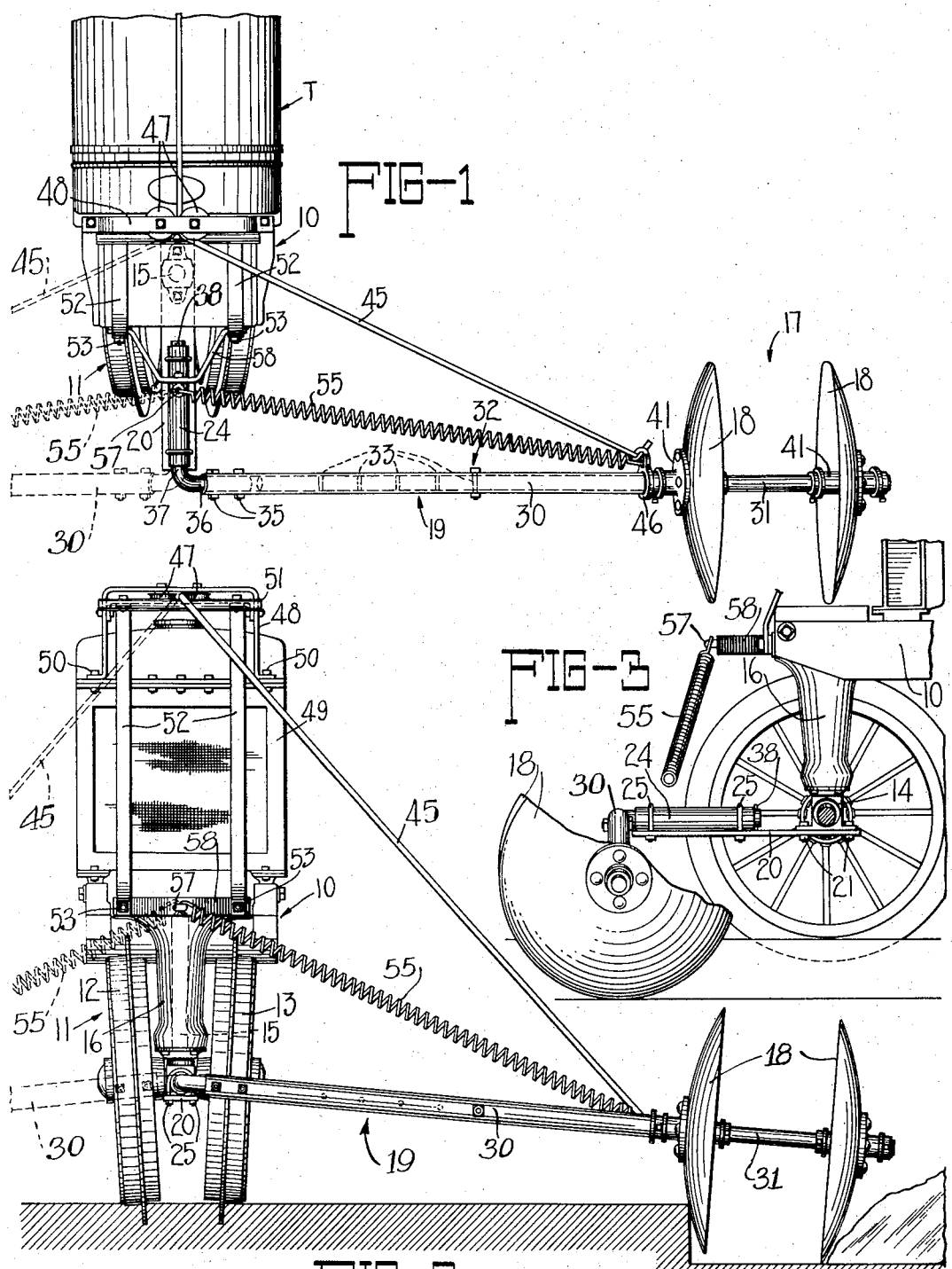

1,936,946

UNITED STATES PATENT OFFICE 1,936,946

TRACTOR GUIDE

Evans Miller, Onawa, Iowa, assignor to Deere & Company, Moline, Ill., a corporation of Illinois Application January 12, 1933. Serial No. 651,261

4 Claims. (Cl. 97—49)

This invention relates to tractor guides, and more particularly to that type of tractor guide having a furrow following device disposed in lateral offset relation with respect to the tractor. Because of the lateral positioning of the furrow following device in this type of guide, the ground resistance acting against the furrow following device tends to swing it rearwardly and steer the tractor in the corresponding direction, even though the furrow being followed is straight. This action seriously interferes with the proper operation of the guide. The main object of the invention is to provide a tractor guide of the above general type in which the tendency of the ground resistance against the furrow following device of the guide to swing the guide rearwardly is counteracted so that the guide is free to swing in either direction in following deviations in the furrow and properly guide the tractor.

Another object of the invention is to provide a tractor guide having a laterally disposed furrow following device capable of being positioned on either side of the tractor and provided with means for counteracting the tendency of the guide to swing rearwardly due to the ground resistance against the guide which is effective in both operating positions of the guide.

Another object of the invention is to provide a guide of this general type wherein the means for counteracting the tendency of the ground resistance against the ground engaging device to swing the guide rearwardly also functions to exert a lifting force on the guide to aid in swinging the guide from one side of the tractor to the other or to an inoperative position.

The manner in which the above objects are accomplished is described and disclosed in the following specification and accompanying drawing wherein is illustrated a preferred embodiment of the invention.

In the drawing—

Figure 1 is a plan view of the guide and tractor to which it is connected, only a fragmentary portion of the tractor being shown. The guide is shown lowered to an operative position on one side of the tractor in full lines, and on the opposite side in dotted lines;

Figure 2 is a front view of the structure shown in Figure 1; and,

Figure 3 is a side view of the structure shown in Figure 1 with parts broken away for a better illustration.

The tractor T, fragmentarily illustrated in the drawing, is of the type comprising a longitudinally extending body 10 supported on its front end on a narrow dirigible two-wheeled truck 11. This truck comprises a pair of wheels 12 and 13 mounted on the opposite ends of an axle 14. Axle 14 is provided with a central vertical spindle 15 which is journaled in a sleeve 16 depending from the front end of the tractor body 10.

Suitable steering connections, not shown, are made with the upper end of the spindle of the truck for turning the truck about a vertical axis for steering the tractor.

The guide comprises a furrow following device 17 in the form of a pair of disks 18 mounted on the outer end of an extensible beam 19 journaled for swinging movement about a longitudinal horizontal axis on the forward end of a steering arm 20 connected to the dirigible truck of the tractor. Steering arm 20 is fixedly connected to the bottom of the axle 14 between the two wheels of the truck by means of a pair of bolts 21. Arm 20 extends forwardly beyond the periphery of the wheels 12 and 13 of the truck and at its forward end a horizontal longitudinally disposed bearing 24 is fixed thereto by means of a pair of U-bolts 25.

Extensible beam 19 comprises a pipe 30 into which is telescoped a beam member 31. Pipe 30 is connected at its inner end by means of bolts 35 to the laterally bent portion 36 of a spindle 37 which is journaled in bearing 24. Spindle 37 is held in position in bearing 24 by means of a cotter pin 38. Disks 18 are fixed to bearings 41 journaled on the outer end of beam member 31 in proper spaced relationship to bear against the sides of a furrow wall. The position of the disks 18 laterally of the tractor may be adjusted by adjusting beam member 31 inwardly or outwardly of pipe 30, the two being held in any relative position of adjustment by means of bolt 32 positioned in any one of the spaced holes 33 in the inner end of beam member 31. To raise the beam 19 to a vertical inoperative position or to swing the beam from one side of the tractor to the other, I provide a lifting means in the form of a cable 45 which is connected at one end to a collar 46 fixed to the outer end of beam 30. Cable 45 passes between a pair of rollers 47 and extends to the rear of the tractor within convenient reach of the operator. Rollers 47 are mounted on an inverted U-shaped bracket 48 carried on the upper end of radiator housing 49 of the tractor and fixed thereto by means of bolts 50. A guide member 51 in the form of a longitudinally disposed shaft is fixed to the bracket 48 just below the plane of pulleys 47. Guide 51 serves to guide the flexible member 45 between the pulleys 47 in either lateral position of the guide. Bracket 48 is braced by means of a pair of upwardly extending brace rods 52 anchored at their lower end to the body of the tractor by means of bolts 53.

By reason of the disks 18 being a considerable distance laterally of the turning axis of the steering truck 11, the ground resistance against the disks tends to swing the beam 19 rearwardly and steer the truck 11 in a corresponding direction even though the disks 18 be running in a perfectly straight furrow. This action would interfere with the proper operation of the guide if means were not provided to counteract this tendency. In the present design, to counteract this steering tendency, a spring 55 has been provided. This spring is anchored at its outer end to collar 46. At its inner end spring 55 is connected to an eye 57 carried by a forwardly extending bracket 58 fixed to the front end of the tractor body 10 by means of bolts 53. Eye 57 is disposed on the longitudinal center line of the tractor and at a point forwardly of the spindle 15 which constitutes the turning axis of the truck 11, and appreciably above bearing 24. By reason of such forward location of the eye 57 to which the inner end of spring 55 is connected, any rearward swinging of the beam 19 must occur at the expense of a further tensioning of spring 55. By reason of this fact, the spring counteracts this tendency of the beam 19 to be swung rearwardly. I make spring 55 of such dimensions that it will just balance the tendency of the beam 19 to be swung rearwardly due to the ground resistance against disks 18 when the disks are traveling in a straight furrow and the tractor is operated at an average speed. With the spring of such dimensions, it does not interfere with the swinging of the beam to steer the tractor caused by the disks 18 following curvatures in the furrow.

By reason of the inner end of the spring being connected on a longitudinal center line of the tractor, it has the same effect to counterbalance this turning tendency caused by the ground resistance against the disks 18 regardless of which side of the tractor the beam 19 is disposed, that is, whether it be positioned as shown in full lines in Figure 1 or in the dotted line position. Furthermore, since the inner end of spring 45 is connected at a point appreciably above the arm 20, it also exerts a lifting force on the beam 19 and thereby aids in raising the beam to a vertical inoperative position or in swinging the beam from one side of the tractor to the other.

What I claim is:—

1. The combination with a tractor comprising a longitudinally extending body supported at its front end on a dirigible truck, of a tractor guide comprising a steering arm fixed to said truck and extending forwardly therefrom, a laterally extending beam journaled on the forward end of said steering arm to swing about a longitudinal axis, a furrow following device carried on the outer end of said beam, means for swinging said beam about said longitudinal axis to dispose said furrow engaging device on either side of the tractor, and a spring connected at one end to said beam and at the other end to the body of the tractor at a point located on the longitudinal center line of the body forwardly of the turning axis of said truck, whereby said spring counteracts the tendency of the ground resistance against said ground engaging device to swing said beam rearwardly, said spring being sufficiently yieldable to permit said furrow following device to follow a furrow.

2. The combination with a tractor comprising a longitudinally extending body supported at its front end on a dirigible truck, of a tractor guide comprising a steering arm fixed to said truck and extending forwardly therefrom, a laterally extending beam comprising a pair of extensible members, the inner end of one of said members being journaled on the forward end of said steering arm to swing about a longitudinal axis, a furrow following device carried on the outer end of the other of said members, means connected to said one of said members for swinging said beam about said longitudinal axis to dispose said furrow engaging device on either side of the tractor, and a spring connected to said one of said members and to the body of the tractor at a point on the longitudinal center line of the tractor forwardly of the turning axis of said truck, whereby said spring counteracts the tendency of the ground resistance against said furrow following device to swing said beam rearwardly, said spring being sufficiently yieldable to permit said ground engaging device to follow a furrow.

3. The combination with a tractor comprising a longitudinally extending body supported at its front end on a dirigible truck, of a tractor guide comprising a steering arm fixed to said truck and extending forwardly therefrom, a laterally extending beam comprising a pair of extensible members, the inner end of one of said members being journaled on the forward end of said steering arm to swing about a longitudinal axis, a furrow following device carried on the outer end of the other of said members, means connected to said one of said members for swinging said beam about said longitudinal axis to dispose said furrow following device on either side of the tractor, and a spring connected to said one of said members and to the body of the tractor at a point on the longitudinal center line of the tractor forwardly of the turning axis of said truck and above said longitudinal axis, whereby said spring counteracts the tendency of the ground resistance against said furrow following device to swing said beam rearwardly and also exerts a lifting force on said beam aiding in swinging said beam about said longitudinal axis, said spring being sufficiently yieldable to permit said furrow following device to follow a furrow.

4. The combination with a tractor comprising a longitudinally extending body supported on its front end on a two wheeled truck turnable relative to the tractor body about a vertical axis, of a tractor guide comprising a steering arm fixed to said truck between said wheels and extending forwardly therefrom, a horizontally and longitudinally disposed bearing fixed on the forward end of said arm, a member journaled in said bearing, said member having a rectangularly bent portion, a pipe fixed to said bent portion, a beam member telescoping into said pipe, a furrow following device carried on the outer end of said beam member, a bracket fixed to the tractor body and extending forwardly of said truck and above said steering arm, and a spring connected between said bracket and the outer end of said pipe, whereby said spring counteracts the tendency of the ground resistance against said furrow following device to swing said beam rearwardly, said spring being sufficiently yieldable to permit said furrow following device to follow a furrow.

EVANS MILLER.